US011884056B2

(12) United States Patent
Hughes et al.

(10) Patent No.: US 11,884,056 B2
(45) Date of Patent: Jan. 30, 2024

(54) FORMING A TEXTURE IN A CAN SURFACE DECORATION

(71) Applicant: CROWN PACKAGING TECHNOLOGY, INC., Alsip, IL (US)

(72) Inventors: Grahame John Hughes, Oxfordshire (GB); Martin Rogerson, Dubai (AE)

(73) Assignee: Crown Packaging Technology, Inc., Alsip, IL (US)

( * ) Notice: Subject to any disclaimer, the term of this patent is extended or adjusted under 35 U.S.C. 154(b) by 636 days.

(21) Appl. No.: 16/467,256

(22) PCT Filed: Dec. 4, 2017

(86) PCT No.: PCT/GB2017/053647

§ 371 (c)(1),
(2) Date: Jun. 6, 2019

(87) PCT Pub. No.: WO2018/104714

PCT Pub. Date: Jun. 14, 2018

(65) Prior Publication Data

US 2020/0079073 A1 Mar. 12, 2020

(30) Foreign Application Priority Data

Dec. 8, 2016 (GB) .................................... 1620917
Sep. 6, 2017 (GB) .................................... 1714339

(51) Int. Cl.
*B41F 17/14* (2006.01)
*B41F 23/08* (2006.01)

(52) U.S. Cl.
CPC .............. *B41F 23/08* (2013.01); *B41F 17/14* (2013.01)

(58) Field of Classification Search
CPC ........................................................ B41F 23/08
USPC .................................... 101/38.1, 483, 39, 40
See application file for complete search history.

(56) References Cited

U.S. PATENT DOCUMENTS 3,766,851 A 10/1973 Sirvet et al.
3,811,915 A 5/1974 Burrell et al.
4,097,635 A 6/1978 Sanz Hernandez et al.
4,233,343 A * 11/1980 Barker .................... B05D 5/06 427/302
4,519,310 A 5/1985 Shimizu et al.
4,652,482 A 3/1987 Diesel et al.
5,281,290 A 1/1994 Bosler
5,830,573 A 11/1998 Lambert et al.
(Continued)

FOREIGN PATENT DOCUMENTS

CN 103180130 A 6/2013
DE 10 2014205679 A1 10/2015
(Continued)

OTHER PUBLICATIONS

Office Action and Search Report issued in Chinese Application No. 201780075764.9, dated May 13, 2020.

*Primary Examiner* — Leslie J Evanisko
(74) *Attorney, Agent, or Firm* — Condo Roccia Koptiw LLP

(57) ABSTRACT

A method of decorating a metal can body and comprising printing a fine pattern onto the can body using a non-varnishable ink, and applying a varnish over the printed fine pattern while the printed non-varnishable ink remains wet. The pattern is configured to give rise to a textured pattern in the varnish once the varnish has dried.

21 Claims, 9 Drawing Sheets

(56) References Cited

U.S. PATENT DOCUMENTS

| | | | | |
|---|---|---|---|---|
| 6,090,449 | A | 7/2000 | Ferdinando et al. | |
| 6,550,389 | B1 | 4/2003 | Goto et al. | |
| 2011/0111118 | A1* | 5/2011 | Schmitt-Lewen | B41M 7/02 427/145 |
| 2011/0237683 | A1* | 9/2011 | Schmid | C09C 1/0024 514/770 |
| 2014/0039091 | A1* | 2/2014 | Owen | B05D 5/065 523/161 |
| 2015/0018441 | A1* | 1/2015 | Wang | C09B 57/00 521/76 |
| 2015/0020364 | A1* | 1/2015 | Bonfoey | B21D 51/50 29/428 |
| 2015/0183211 | A1 | 7/2015 | Petti et al. | |
| 2015/0217559 | A1 | 8/2015 | Carreras et al. | |
| 2016/0009932 | A1* | 1/2016 | Jang | B05D 5/02 524/269 |
| 2017/0298240 | A1* | 10/2017 | Ramirez | C09D 11/101 |

FOREIGN PATENT DOCUMENTS

| | | | | |
|---|---|---|---|---|
| EP | 1211095 | A1 | | 6/2002 |
| EP | 1690602 | A1 | | 8/2006 |
| GB | 1133604 | A | | 11/1968 |
| JP | 2001-030612 | A | | 2/2001 |
| JP | 3473513 | B2 | | 12/2003 |
| JP | 2009-172943 | A | | 8/2009 |
| JP | 2012254528 | A | * | 12/2012 |
| JP | 2013-544675 | A | | 12/2013 |
| WO | WO 2012/054655 | A1 | | 4/2012 |
| WO | WO 2012/148576 | A1 | | 11/2012 |
| WO | WO 2016/168488 | A1 | | 10/2016 |

* cited by examiner

FORMING A TEXTURE IN A CAN SURFACE DECORATION

CROSS-REFERENCE TO RELATED APPLICATIONS

This application is the National Stage of International Patent Application No. PCT/GB2017/053647, filed Dec. 4, 2017, which claims the benefit of Great Britain application number 1620917.3, filed Dec. 8, 2016 and Great Britain application number 1714339.7, filed Sep. 5, 2017, the disclosures of which are incorporated herein by reference in their entireties.

TECHNICAL FIELD

The present invention relates to forming a texture in a can surface decoration and more particularly to forming such a texture using agglomeration of a surface varnish.

BACKGROUND

Metal cans such as steel and aluminium beverage cans are commonly manufactured in two pieces. A first part comprises a generally cylindrical container body with integral base, formed from a circular metal disk using a drawing and ironing process. A second part comprises an end having a tab or ring-pull formed therein. The can is filled, e.g. with beverage, and the end subsequently fixed to the body using a seaming process. Three piece cans are also known and comprise a rolled and welded can body with top and bottom ends attached.

Can decorators are known in the art for applying decoration to the external surface of a can body. Typical decorators make use of a dry offset printing process to apply decoration to the can body prior to filling of the can body and prior to seaming of the end(s). The prior art can decorator is a relatively complex apparatus, but is illustrated schematically in FIG. 1. On the left hand side of the illustration there is shown a can body conveying mechanism 1 comprising a set of mandrels 2 rotating about a common axis. A blanket wheel is shown on the right hand side of the Figure, as are a set of 6 inking stations 5, each loaded with a different ink colour. Each inking station comprises a set of inking rollers and a print cylinder onto which ink is applied. Distinct artworks are formed using high relief plates mounted on each of the print cylinders.

Blankets 7 are mounted on a blanket wheel 4 via respecting blanket segments 6. As the blankets pass through the inking stations, the discrete artworks are transferred to them. The result is a multi-colour composite image on the blankets. Unprinted or "blank" can bodies are loaded onto the mandrels. These are then brought into a printing zone 3 where the can bodies are brought into contact, i.e. rolled across, the pre-inked blankets.

In some production lines, can bodies are pre-coated with a basecoat which is dried prior to the can bodies entering the can decorator. Typically, the basecoat is applied to the bare metal surface and is applied in a thick film providing a reflective base for subsequent printing processes. The decorator then applies a multi-colour decoration to the can body on top of the basecoat.

The multi-colour decoration is generally not resilient, thus varnishes are typically layered on top of the decoration to provide gloss and protection from abrasion and/or corrosion. Varnishes are typically clear and are applied with a thickness in the range 3-5 microns.

Can decorators are described in more detail in WO2012/148576 and U.S. Pat. No. 3,766,851.

It is known that a texture can be formed in an overlying varnish by decorating the can bodies using an ink that is antagonistic with the varnish (effectively a non-varnishable ink), in contrast with the use of conventional inks which do not affect the overlying varnish. Such antagonistic inks may cause the varnish to agglomerate, i.e. clump, to some extent. FIG. 2 is a micrograph illustrating an exemplary tactile decoration produced over a decorated can body. The texture effect of FIG. 2 is formed by a standard varnish filmweight (approximately 4-6 grams per square metre) over a region of grey non-varnishable ink. Decoration may be carried out using a combination of varnishable and non-varnishable inks to in order to produce a combination of smooth and tactile areas. More extreme effects can be achieved with varnish thicknesses applied up to 10 microns.

EP1211095 describes a process for producing a three-dimensional effect on a product. This involves printing a pattern using an ink containing an additive which results in a reduced surface tension after the ink has been dried. The dried pattern is subsequently coated with a resin, whereupon the resin tends to collect in the non-printed areas, i.e. forming raised ridges. EP1211095 does not describe a process that is suited to ultra-high speed production lines used for manufacturing can bodies.

SUMMARY

According to the present invention there is provided a method of decorating a metal can body and comprising printing a fine pattern onto the can body using a non-varnishable ink, and applying a varnish over the printed fine pattern while the printed non-varnishable ink remains wet. The pattern is configured to give rise to a textured pattern in the varnish once the varnish has dried.

The dimensions of printed features in the fine pattern may be substantially the same as the spacing between the printed features. For example, the spacing between printed features in the fine pattern may be less than 1 mm, preferably less than 0.4 mm. The spacing between printed features in the fine pattern may be less than 0.25 mm, preferably between 0.05 and 0.15 mm. Feature sizes may have similar dimensions, e.g. line or spot width. The filmweight of the non-varnishable ink may be less than 1.5 microns. The fine pattern may be an Intaglio pattern.

The fine pattern may be a substantially regular array of printed and unprinted areas which gives rise to a substantially regular textured pattern. The printed areas may be discrete areas.

The method may comprise printing varnishable ink into said pattern to provide alternating areas of varnishable and non-varnishable ink. The non-varnishable ink, or one or both of the inks (varnishable and non-varnishable), may be a clear ink.

The maximum thickness of varnish within the textured pattern may be between 1.2 and 3 times the nominal thickness of the applied varnish.

The step of applying a varnish may be carried out less than 500 milliseconds after said step of printing, preferably between 50 and 120 milliseconds.

Following said steps of printing and applying, the can body may be passed through an oven in order to dry both the ink and the varnish.

The non-varnishable ink may be a solvent-based dry offset ink.

Regions between the fine pattern may be unprinted with ink such that in these regions the varnish is applied to the metal substrate. Alternatively, prior to applying said varnish, a second fine pattern may be printed onto the can body using a varnishable ink, said second fine pattern and said first mentioned fine pattern being substantially non-overlapping.

The ink, or inks, may be a clear ink containing a fluorescent additive which can be activated by exposure to UV light, e.g. at a wavelength typically between 350 and 400 nm The ink, or inks, may be an ink containing thermochromic or photochromic pigments.

The first mentioned fine pattern may comprise an array of discrete non-varnishable ink spots. Each ink spot may have an area of 1 mm2 or less, preferably less than 0.2 mm2.

The varnish may include a coloured pigment or dye, or an effect pigment, for example leafing or non-leafing aluminium flake, interference effect, or pearlescent effect.

DETAILED DESCRIPTION

Figure 1:
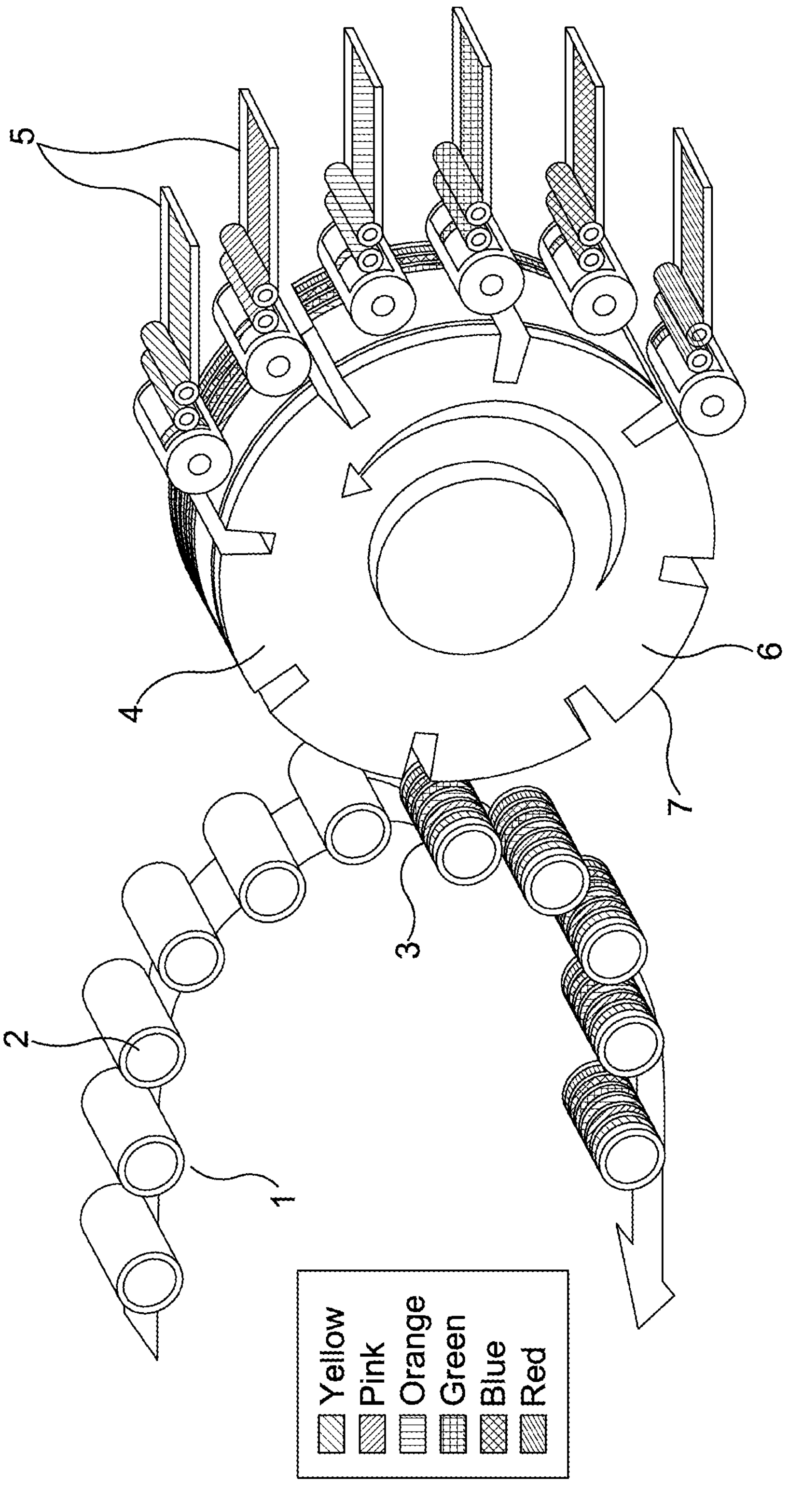
Figure 1 (Prior Art)
FIG. 1 illustrates schematically a can decorator apparatus known in the prior art.
Figure 2:
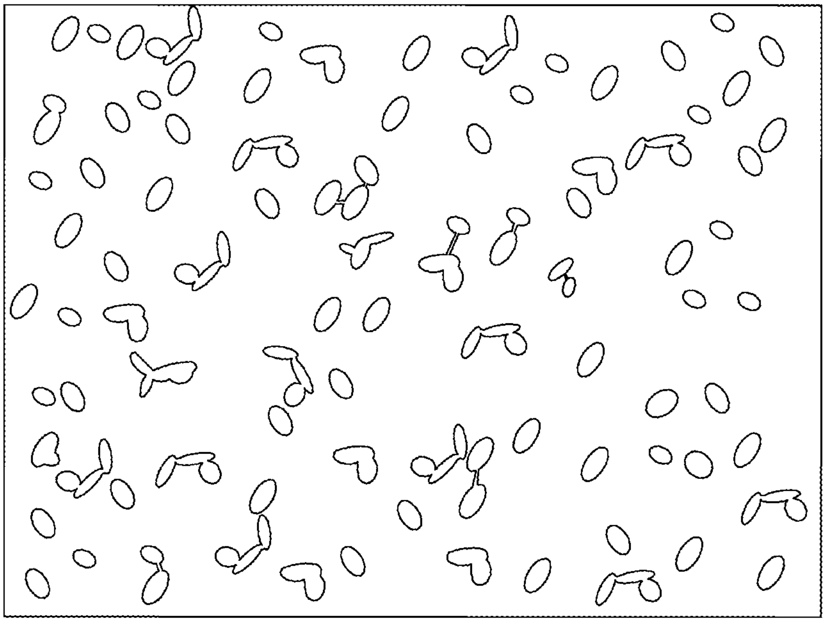
Figure 2 (Prior Art)
FIG. 2 is a converted micrograph illustrating a prior art texture effect.

As has been described above, a texture can be formed in a can body varnish by decorating the can body using a non-varnishable ink. The result, as illustrated in FIG. 2, is a rough texture without any discernible pattern. The only pattern which is visible is that created "randomly" by the unpredictable reaction between the solid area of ink and the area of varnish applied over said ink.

Figure 3:
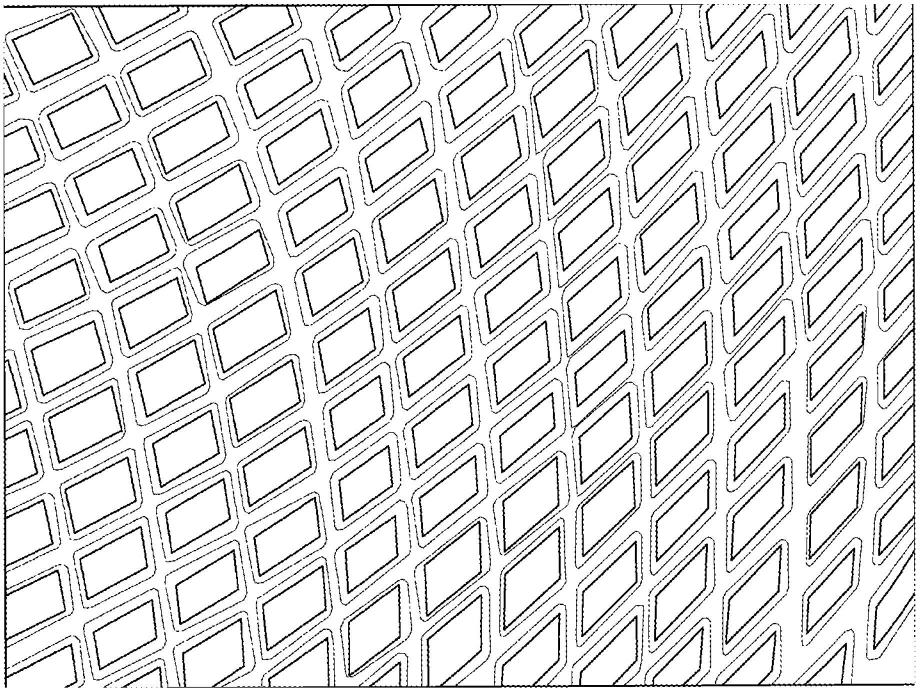
FIG. 3 is a converted micrograph illustrating an embossed texture effect according to an embodiment of the invention.

FIG. 3 illustrates a regular textured pattern (at ×40 magnification) formed in a varnish on a metal can body, according to an embodiment of the present invention. The texture pattern of FIG. 3 is formed by applying a medium filmweight varnish (approximately 4-6 grams per square metre) over a non-varnishable (49R207664 base—white—INX™ International UK Ltd) ink. This non-varnishable ink is a solvent-based dry offset ink and contains no water (and has no protein or silicone content). Of course other solvent-based dry offset ink may be used instead. The non-varnishable ink is printed onto the metal can body substrate as an array of discrete spots or islands. Each spot has an area of 1 $mm^2$ or less, preferably less than 0.2 $mm^2$.

The temperature at which the ink is printed is typically between 25 and 50 degrees Celsius although this will depend upon a number of factors including for example ink type, coverage, and the effectiveness of cooling systems on the decorator. The texture pattern results from certain fine features (the array of spots) of the underlying decoration created with a non-varnishable ink. Fine details in the printed ink pattern (approximately 0.3 mm across) "force" varnish into the fine gaps between non-varnishable ink coated areas. This generates an interesting tactile finish caused simply by the primary de-wet from the non-varnishable white ink surface. The resulting can body appears as if it has been embossed with a regular pattern. It is noted that the regularity of the fine features in combination with the de-wet effect gives the optical embossing effect, which is reinforced by the texture of the finish. It is also noted that some varnish will remain over the non-varnishable ink areas. This is important to retain the abrasion resistance properties of the can body.

Figure 4:
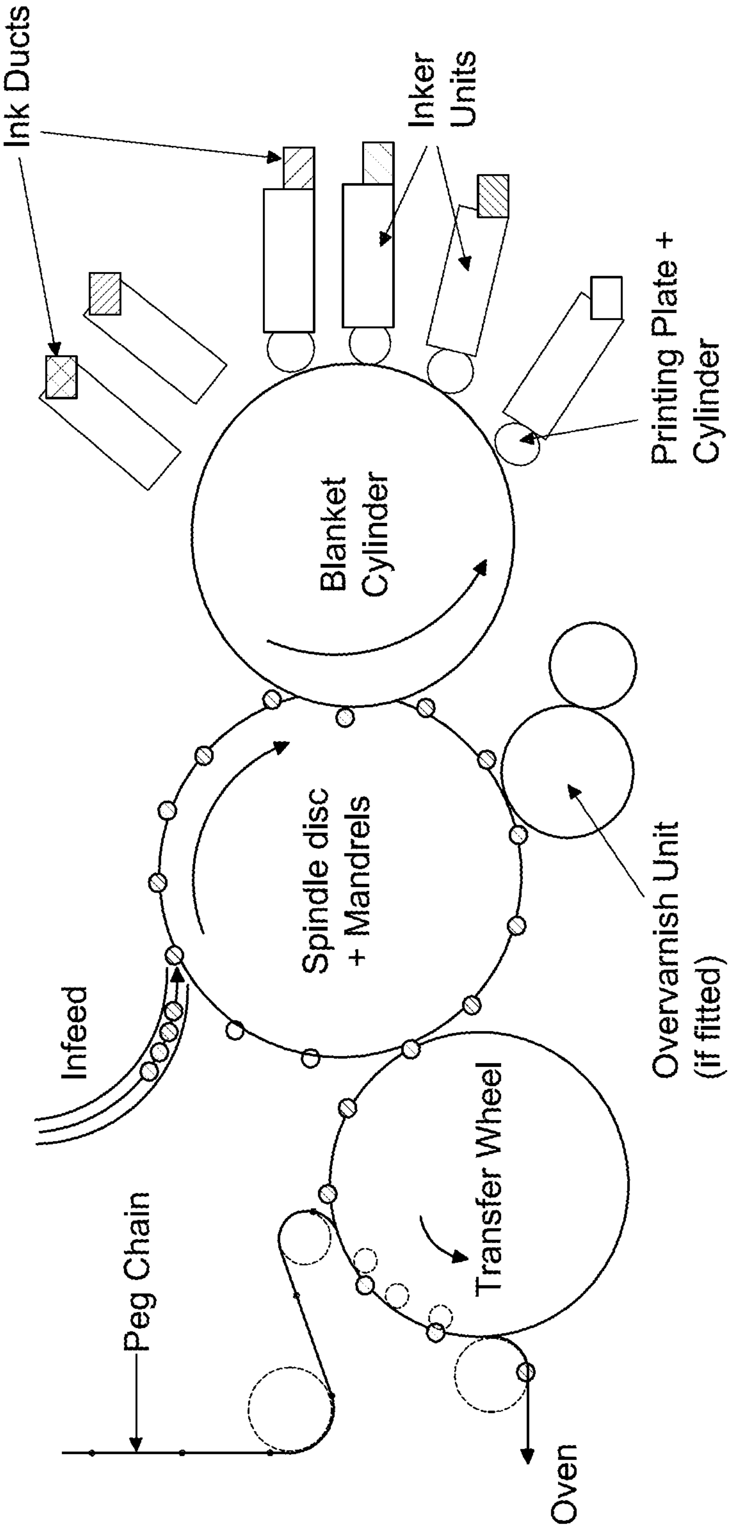
FIG. 4 illustrates schematically a can decorator including inking and varnishing stations.

In producing this textured effect it is important to note that a "wet-on-wet" process is used, i.e. the varnish is applied while the printed non-varnishable ink remains wet. FIG. 4 illustrates schematically a can decorator including a blanket decorator with multiple (colour) inking stations. After inking can bodies are moved to an overvarnish unit before being moved to a transfer wheel and from there into a drying oven (operating at around 200 degrees Celsius). At typical line speeds the time between a can body being inked to the overvarnish being applied is in the region of 50-120 milliseconds. During this time the ink will not dry to any significant extent meaning that the overvarnish is applied onto the wet ink. It is observed that "wet-on-wet" process enhances the tendency of the varnish to move away from the inked areas onto the non-inked areas, as compared with wet-on-dry printing.

Figure 5:
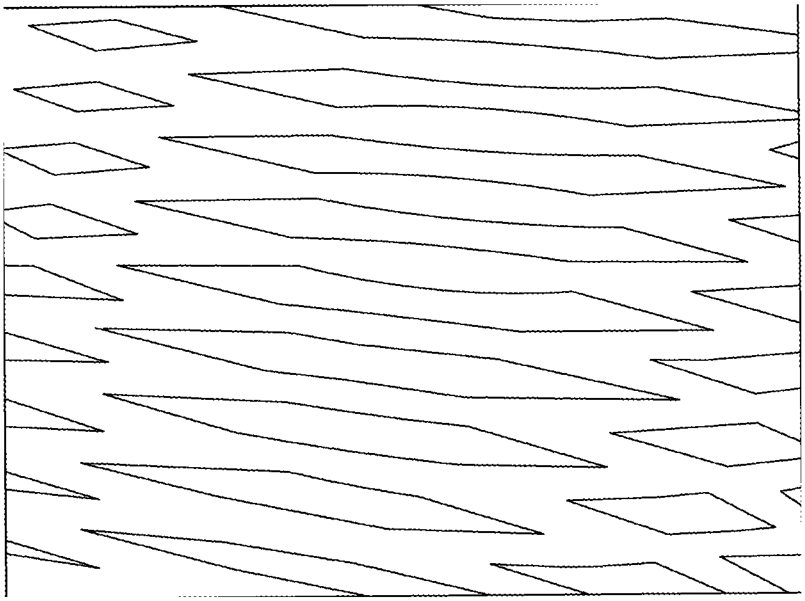
Figure 5 (Prior Art)
FIG. 5 illustrates a smooth texture effect known in the prior art.

By way of contrast, FIG. 5 illustrates a smooth surface finish achieved with the same decoration pattern but where the ink is a varnishable ink. The varnish appears smooth over both varnishable white ink and base metal, with no tactile features. The texture effect of FIG. 5 is formed by a standard varnish filmweight (approximately 4-6 grams per square metre) over a white varnishable ink (RN20334 base).

Figure 6:
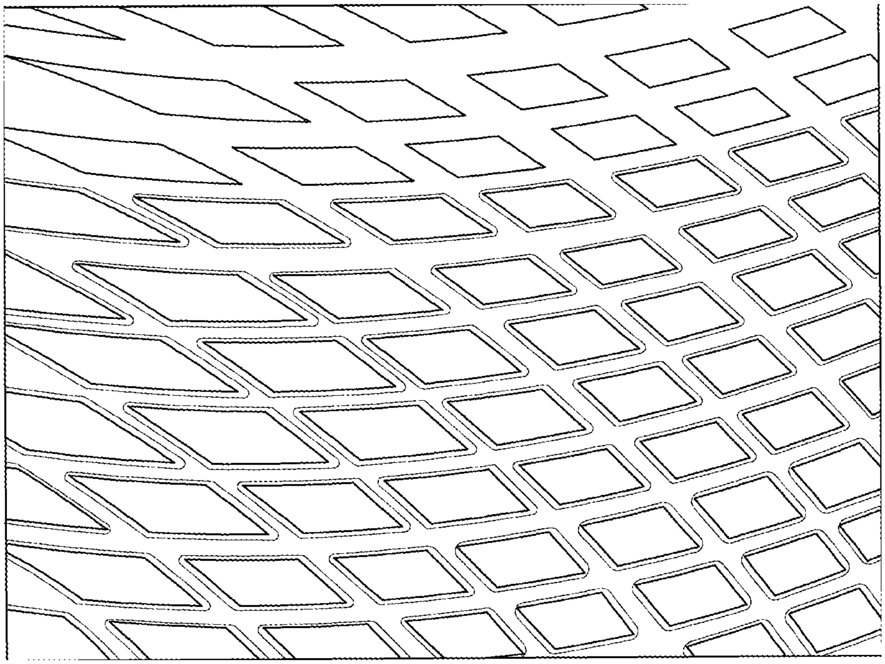
FIG. 6 is a converted micrograph illustrating a combination of smooth and embossed texture effects.

FIG. 6 illustrates an effect created by a combination of varnishable and non-varnishable inks, using the same underlying decoration pattern. The distribution of inks creates a smooth finish and tactile finish respectively. The feature transitions between the two different ink patterns are preferably smooth. Such a transition may be provided at the junction between the main can body and an end region to be necked. This may be helpful to avoid problems with necking of the embossed finish surface. Printing a pattern comprising a combination of varnishable and non-varnishable inks may also provide an enhanced finish that is smooth or tactile respectively in different locations on the printing surface.

Figure 7:
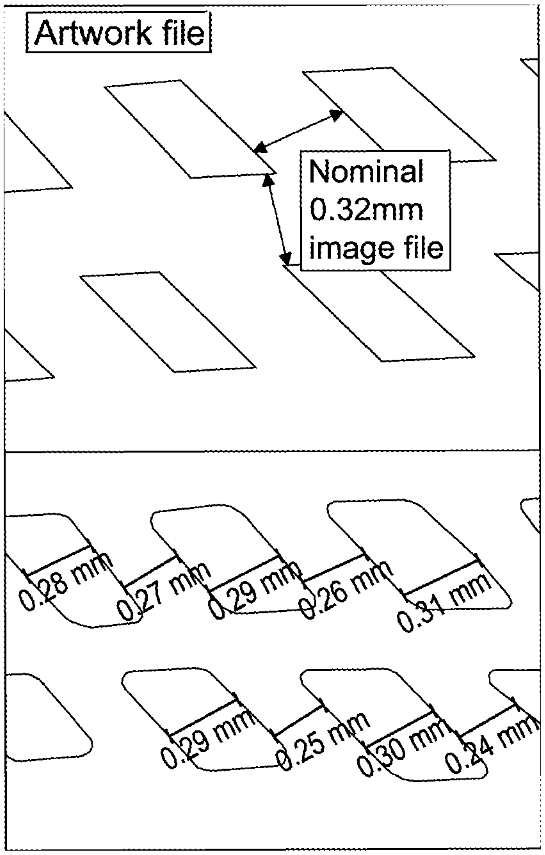
FIG. 7 illustrates an exemplary artwork pattern and printed result.

FIG. 7 illustrates an exemplary artwork pattern and printed result, where the blue regions identify areas to be printed with non-varnishable ink and the grey regions identify unprinted regions. The minimum separation (between features) and the size of features is largely dependent on machine type and condition, as well as the pattern specification required to guarantee the desired effect at line speed. The inventors have ascertained that during printing, some growth of individual pattern features typically occurs. This is evident from the larger printed pattern structures in FIG.

7. The feature size and minimum separation between features should therefore preferably be at least 0.1 mm to avoid merging of features. The separation between features in the pattern may optionally be in the range 0.1 mm to 1 mm. The size of the features in the pattern is optionally substantially equal to the separation between features in the pattern. For example, the area of the pattern features may comprise 40-60%, e.g. 50%, of the total surface area of the printable surface (i.e. the surface on which the texture pattern is to be created).

Figure 8:
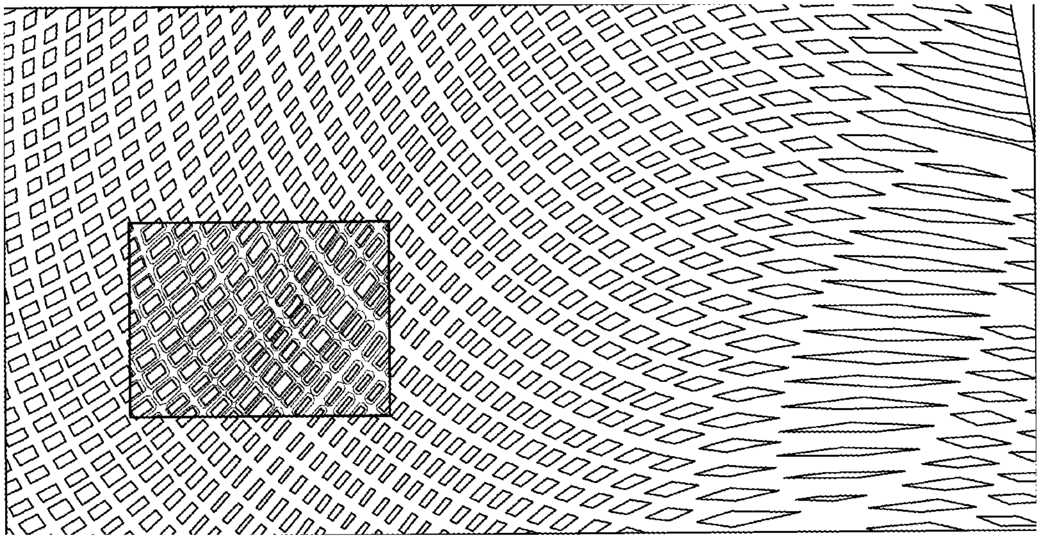
FIG. 8 illustrates an exemplary artwork pattern overlaid with a converted micrograph of the printed and varnished result.

FIG. 8 illustrates an exemplary artwork pattern overlaid by a converted micrograph (i.e. where a micrograph has been converted to an equivalent line drawing) of the printed result.

Figure 9:
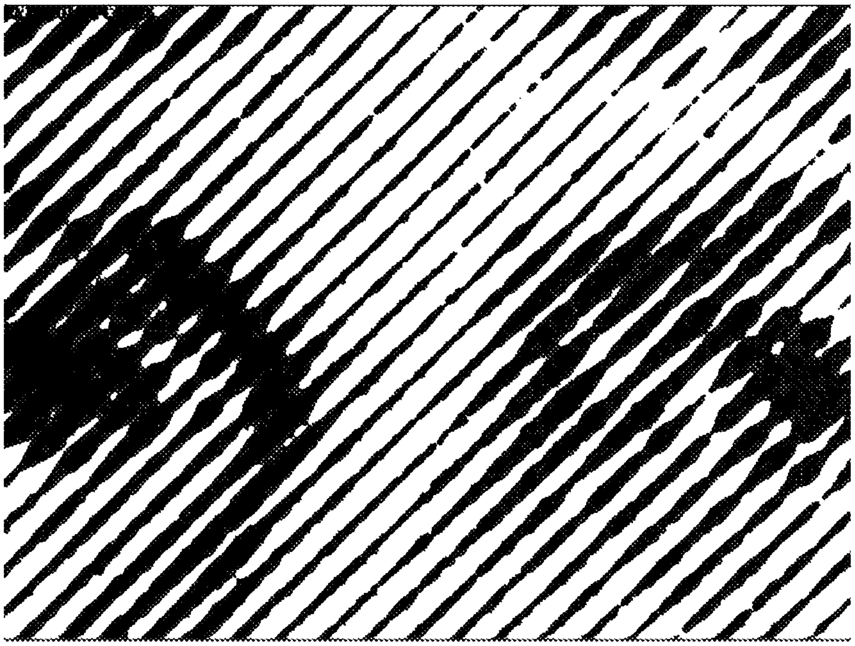
FIG. 9 illustrates an example Intaglio pattern.

FIG. 9 illustrates an example Intaglio pattern formed by continuous lines. An Intaglio pattern may be well suited for use with the present invention as it may inherently possess the characteristics to produce a texture pattern in an overlying varnish.

Figure 10:
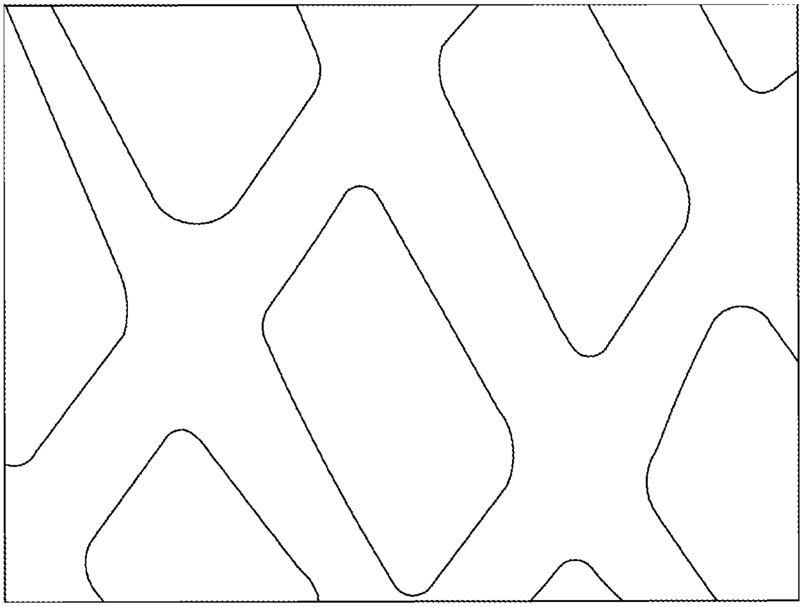
FIG. 10 illustrates a texture pattern formed by a normal ink filmweight.
Figure 11:
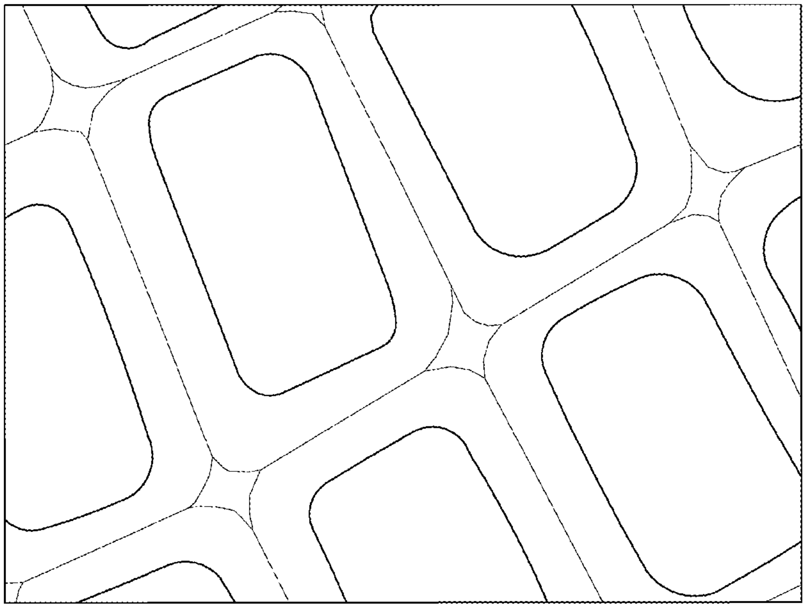
FIG. 11 illustrates a texture pattern formed by a higher ink filmweight.

FIG. 10 is a converted micrograph illustrating a pattern formed by a normal ink filmweight (approximately one micron) whilst FIG. 11 is a converted micrograph illustrating a pattern formed by a higher ink filmweight (approximately 1.5 microns). As illustrated in FIGS. 10 and 11, an ink filmweight of less than 1.5 microns thick may provide a texture pattern with significantly more distinct edges.

Generally, the method for decorating a can may comprise applying a fine pattern of non-varnishable ink to a can body and then applying varnish on top of the applied ink. The varnish may be applied, for example, using a roller coater or anilox/gravure coater. The gaps between rollers of the roller coater and speeds of the rollers determine the thickness of the varnish coating. In an anilox/gravure coater, the cell volume and structure of the engraved roller determines the film weight of applied varnish, and will give less variation with changing line speed than a roller coater. In addition, the cell structure and volume of an engraved anilox or gravure roller can be varied to give effect variation across the can, and areas of reduced filmweight, for instance in the necked in area, to aid necking without reducing an effect over the rest of the can which relies on high film weight of varnish. The varnish is typically dried or cured after application to the wet inks. Tactile patterns may be formed using, for example, RN20334 white or other colours including clear from the same non-varnishable ("novar") ink range. Non-tactile patterns may be formed using 49R207664 white or other colours from the same varnishable ink range.

Considering now the height of the texture pattern features, these will clearly be a function of the nominal thickness of the applied varnish and the desired texture. By way of example only, it might be desirable that the maximum varnish thickness within a textured area be less than three times the nominal varnish thickness, possibly less than two times the nominal thickness. The thicker regions may be in an area of the can body where a varnish overlap occurs. So, if the "underlap" has a thickness T, then the overlap may have a thickness 1.5 T. If non-varnishable ink is present in the overlap region, this may double the varnish thickness to 3 T. Nominal underlap thicknesses will be approx. 3 gsm (grams per sq meter) and with dry film densities typically 1.00-1.30, this gives a value for T between 2 and 4 microns, giving the emboss effect agglomerated thickness of 4-8 microns in the underlap area of the can, and 8-12 microns in the 3T area. Of course other textures and thicknesses may be possible/desirable, including matt features using narrow line or feature widths and/or lower varnish thicknesses.

In the embodiments described above, the regions where a texture pattern is to be created is printed with only a non-varnishable ink. In other embodiments however, the effect may be enhanced by printing with a combination of varnishable and non-varnishable inks. For example, a grid of varnishable ink may be printed with varnishable ink being printed as spots within the grid. In some cases, the inks may be transparent inks, varnishable and/or non-varnishable. Printing may be carried out on top of a baselayer or directly onto the can body material.

Figure 12:
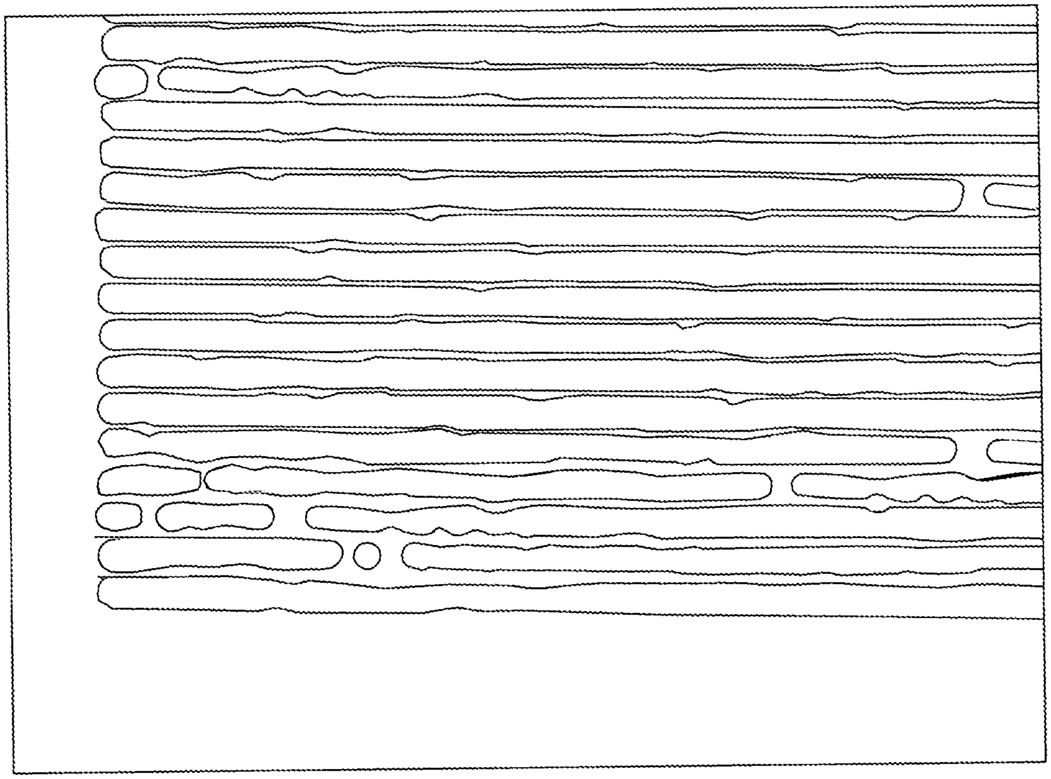
FIG. 12 shows a texture pattern created by over varnishing an ink pattern comprising alternating lines of varnishable and non-varnishable ink.

In some cases it may be desirable to reduce the feature size and/or feature separation (of the printed fine pattern) to below that described above, e.g. 0.1 mm or less. By doing this it is possible to produce a controlled matt surface appearance using very fine printed lines that is both distinct from the type of effect achieved in the prior art using a solid area of non varnishable ink, and the embossing type effect described above and illustrated in FIG. 3. FIG. 12 is a converted (photo) micrograph, at approximately ×40 magnification, of a surface produced using alternating lines, approximately 0.1 mm in width, of non varnishable and varnishable black inks printed in a substantially non-overlapping, "kiss-fitting" arrangement. Although there is some limited bridging across line features, the lined structure of alternating varnished features is still evident at this magnification. However, when viewed with the naked eye the lined areas take on a matt appearance compared to the uniform area of varnishable ink that surrounds them.

Figure 13:
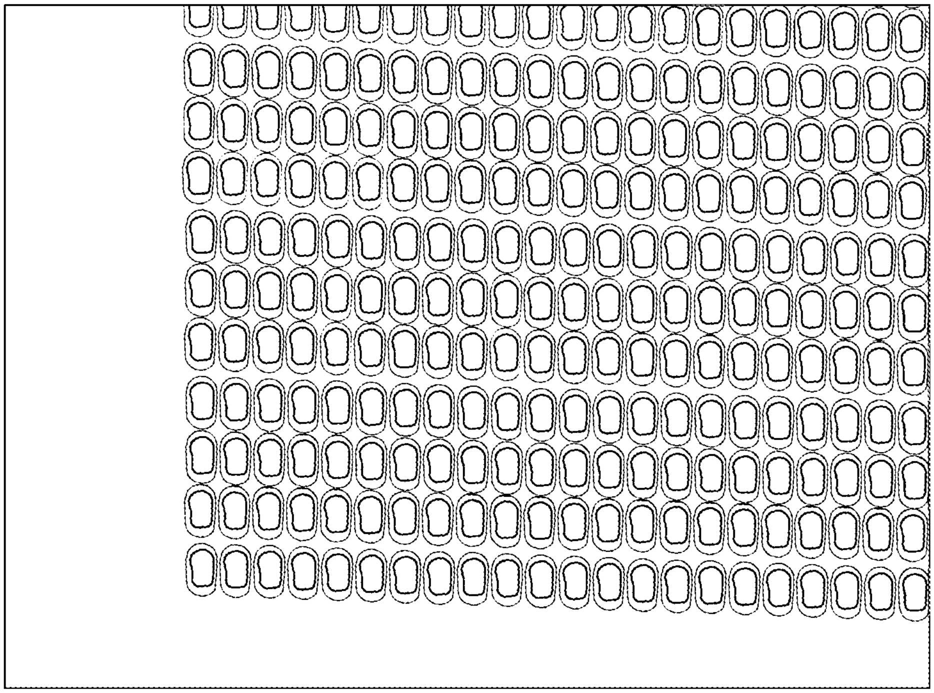
FIG. 13 shows a texture pattern created by over varnishing an ink pattern

FIG. 13 (approximately ×40 magnification) is a coverted micrograph of a surface created using a pattern comprising intermittent or broken, rather than continuous, lines printed with non-varnishable ink, with the remaining area being printed with varnishable ink. This provides a means to reduce the amount of effect bridging, and, therefore, potentially improve control of the matt effect.

It should be clear to those skilled in the art that combinations of line or feature thickness, varnish film weight, and ink colours and types will produce differing effect intensities within the scope of the current invention. This method potentially gives controlled, specific areas of matt finish within an overall glossy can decoration, and that is unachievable using traditional matt or gloss overvarnishes. Furthermore, this method gives a more predictable and controlled matt finish than is achievable using a varnish applied over a solid print of non varnishable ink as shown in FIG. 2.

It will be appreciated by the person of skill in the art that various modifications may be made to the above described embodiment without departing from the scope of the present invention. By way of example, the method and apparatus described in WO/2014/128200 may be employed to allow variable texture patterns to be created within a single can body production line. WO/2014/128200 describes the creation of positive secondary images on the decorator blankets, with different secondary images on each of the blankets on the blanket wheel. By, for example, providing these secondary images with a patterned surface, different blankets can provide different texture patterns. Indeed, areas of the blanket surface can be engraved or embossed to print patterns resulting in texture patterns in the final varnished can bodies. This may be as an alternative or in addition to patterns printed as a result of the print cylinders.

The invention claimed is:

1. A method of decorating a metal can body in a can decorator, comprising the steps of:

printing an ink pattern onto the can body using an ink, a spacing between printed features in the ink pattern being less than 1 mm; and applying a varnish over the printed ink pattern while the printed ink remains wet, the ink being antagonistic with the varnish to cause the applied varnish to agglomerate, the printed ink pattern being configured to give rise to a textured and tactile pattern in the varnish once the varnish has dried.

2. The method according to claim 1, wherein a dimension of printed features in the ink pattern is substantially the same as a spacing between the printed features.

3. The method according to claim 2, wherein the spacing between printed features in the ink pattern is less than 0.4 mm.

4. The method according to claim 1, wherein an area of the printed features comprises 40% to 60% of the total surface area of the surface on which a textured pattern is to be created.

5. The method according to claim 1, wherein a thickness of the ink is less than 1.5 microns.

6. The method according to claim 1, wherein the printed features of said printed ink pattern includes an array of printed and unprinted lines which gives rise to a textured pattern.

7. The method according to claim 6, wherein said printed lines are discrete areas.

8. The method according to claim 1, wherein said printed ink pattern is an Intaglio pattern, the Intaglio pattern being formed by continuous lines.

9. The method according to claim 1, further comprising printing into said printed ink pattern to provide alternating areas of varnishable and non-varnishable ink.

10. The method according to claim 1, wherein the ink is a clear ink.

11. The method according to claim 1, wherein a maximum thickness of varnish within the textured pattern is between 1.2 and 3 times a nominal thickness of the applied varnish.

12. The method according to claim 1, wherein said step of applying the varnish is carried out less than 500 milliseconds after said step of printing.

13. The method according to claim 1, further comprising, following said steps of printing and applying, passing the can body through an oven in order to dry both the ink and the varnish.

14. The method according to claim 1, wherein said ink is a solvent-based dry offset ink.

15. The method according to claim 1, wherein regions between the ink pattern are unprinted with ink such that in these regions the varnish is applied to the can body.

16. The method according to claim 1, wherein the printed ink pattern is a first printed ink pattern, the method further comprising a step of, prior to applying said varnish, printing a second ink pattern onto the can body using a second ink, said second ink pattern and said first ink pattern being substantially non-overlapping.

17. The method according to claim 1, wherein the ink is a clear ink containing a fluorescent additive that is activated by exposure to UV light at a wavelength between 350 and 400 nm.

18. The method according to claim 1, wherein the ink is an ink containing thermochromic or photochromic pigments.

19. The method according to claim 1, wherein said printed ink pattern comprises an array of discrete ink spots.

20. The method according to claim 19, wherein each ink spot has an area of 1 $mm^2$ or less.

21. The method according to claim 1, wherein the varnish includes a coloured pigment or dye, or an effect pigment.

* * * * *